Oct. 26, 1971　　G. F. BOLLING ET AL　　3,614,976
ROTARY METHOD OF CASTING

Filed Sept. 13, 1968　　　　　　　　　　　　3 Sheets-Sheet 1

*STATIC MOLD*

GUSTAF F. BOLLING
GERALD S. COLE
　　　INVENTORS

BY *John R. Faulkner*
　　*Thomas H. Oster*

ATTORNEYS

Oct. 26, 1971          G. F. BOLLING ET AL          3,614,976
                      ROTARY METHOD OF CASTING
Filed Sept. 13, 1968                              3 Sheets-Sheet 2
STEADY-STATE
ROTATION
DISRUPTION AFTER
2 MINUTES
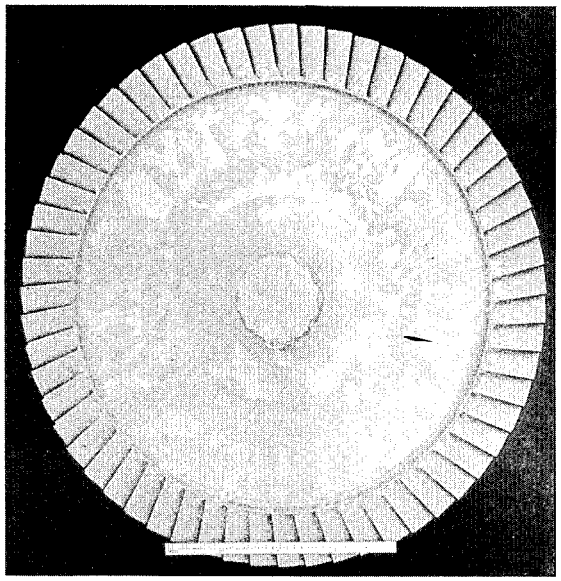
FIG.5
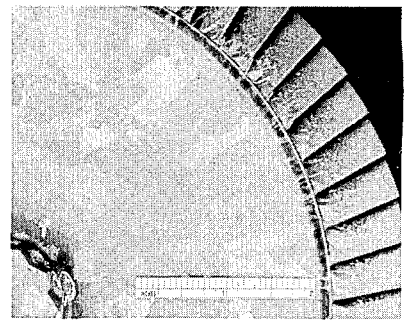
FIG.6         ↑
              2 MINUTES
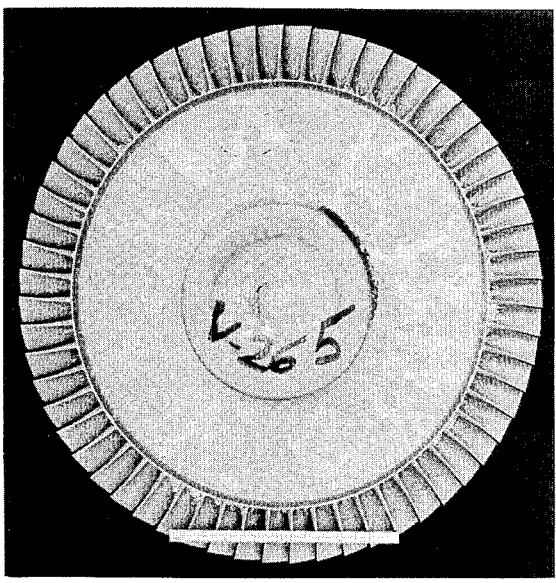
FIG.7
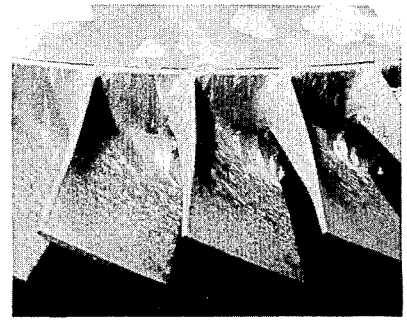
FIG.8
GUSTAF F. BOLLING
GERALD S. COLE
            INVENTORS
BY John R. Faulkner
   Thomas H. Oster
            ATTORNEYS

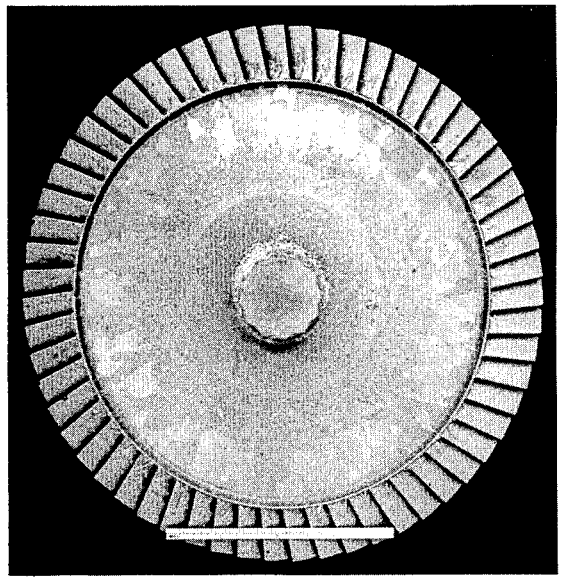
FIG. 9
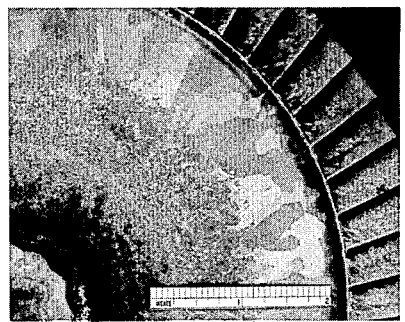
STEADY-STATE
ROTATION
OSCILLATION AFTER
2¼ MINUTES
FIG. 10    ↑
         2¼ MINUTES
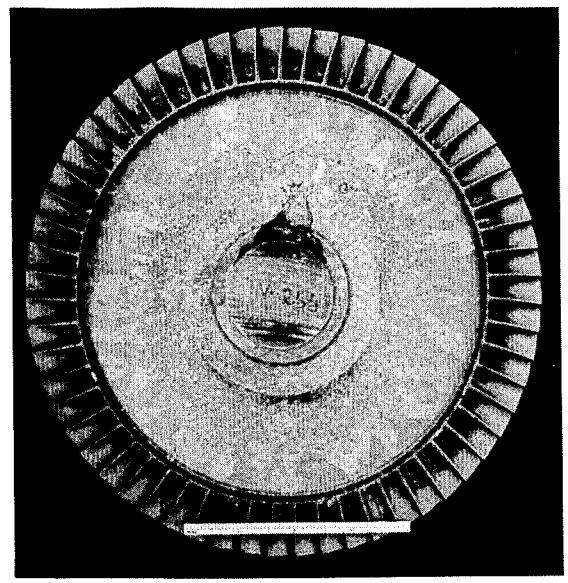
FIG. 11
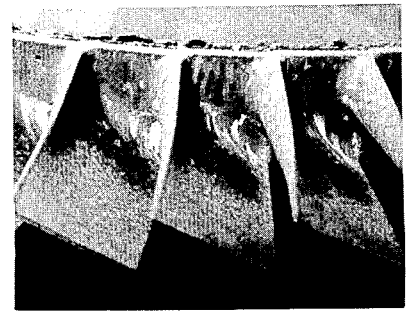
FIG. 12
GUSTAF F. BOLLING
GERALD S. COLE
INVENTORS
ATTORNEYS 3,614,976
ROTARY METHOD OF CASTING
Gustaf F. Bolling and Gerald S. Cole, Dearborn, Mich., assignors to Ford Motor Company, Dearborn, Mich.
Filed Sept. 13, 1968, Ser. No. 760,126
Int. Cl. B22d 27/08
U.S. Cl. 164—122                                            2 Claims

ABSTRACT OF THE DISCLOSURE

Rotating a casting during solidification at a constant rate sufficient to inhibit convective flow in the solidifying metal to produce columnar grain structure and subsequently at an angular acceleration sufficient to inhibit the formation of a columnar structure in the solidifying metal and produce an equiaxed grain structure.

---

The origins of the founding art are lost in the midst of time and it has long been known that the final properties of castings are strongly influenced by the grain structure present. Much time and effort has been expended in an effort to obtain grain structures deemed optimum for any given casting. Variables such as metal composition, degree of superheat, mold materials and temperature, inoculation and rate of cooling have been employed to give grain structures deemed optimum for the intended use of the casting.

This invention is predicated upon our discovery that the grain structure of castings generally and particularly the grain structure of castings which approximate objects of revolution can readily be controlled by either slow rotation or very mild angular acceleration preferably about an axis coincident with the axis of the castings.

The velocity of rotation employed in the current process is not to be confused with the much greater velocity of rotation conventionally employed in the process known as centrifugal casting. Such a conventional centrifugal casting process is taught by a patent issued Oct. 27, 1942 to S. M. Stoody et al. as 2,299,860. This patent teaches the production of an aircraft supercharger wheel from heat and corrosion resistant alloys and of approximately the same size as described later in the current invention. Stoody states in line 46 of page 3 that the rate of rotation is 1,500 r.p.m. This is to be contrasted with the 60 r.p.m. which has been found to be adequate for the execution of applicants' process. Inasmuch as the centrifugal forces vary as the square of the peripheral speed divided by the radius, the Stoody process which is typical of commercial practice would subject the metal to stresses 625 times as great as those employed by applicants.

The invention can best be illustrated and understood by reference to photographs of the etched structures produced in the manufacture of turbine wheels. All of these wheels were cast from Inco 713, a commercially well known high temperature casting alloy.

Figure 1:
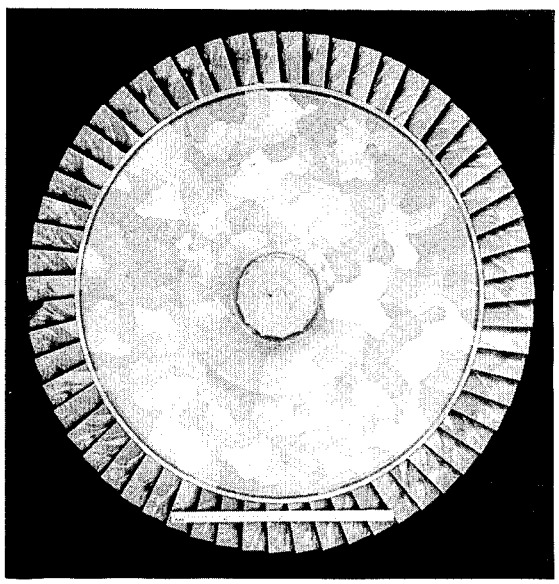
Figure 2:
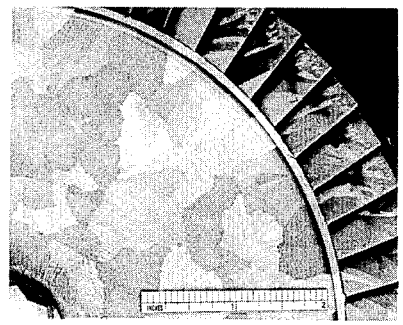
Figure 3:
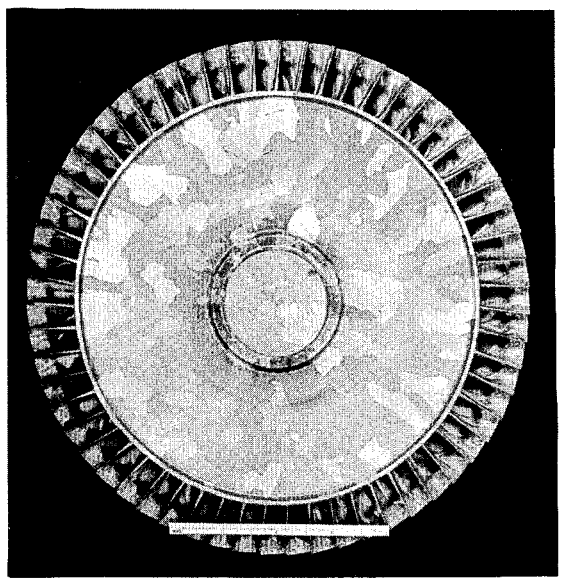
Figure 4:
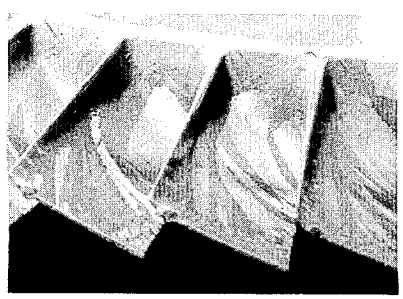

These photographs have been presented on three sheets of drawing, each sheet representing a different casting. On each sheet of drawing the photograph to the upper left, that is FIGS. 1, 5 and 9, represents the bottom surface of the turbine wheel. Similarly the photograph at the upper right of each sheet of drawing represents a quadrant of the bottom surface at higher magnification. These are FIGS. 2, 6 and 10. The photographs at the bottom left of each sheet, that is FIGS. 3, 7 and 11, depicts the upper surface of the turbine wheel after the riser has been severed. Finally, the photographs at the bottom right of each sheet of drawing, that is FIGS. 4, 8 and 12, are directed to a higher magnification of the upper surface of the wheel showing the blades and the connection of the blades to the wheel body.

FIGS. 1 to 4 illustrate a typical static gravity casting. These figures will show upon examination a very minor amount of equiaxed grains at the very tip of the blades due to initial chilling effect and the remainder of the wheel to be exclusively a large grained and undesirable gross dendritic structure.

The structures depicted in FIGS. 5 through 8 were obtained in a mold coated with a commercially available inoculant specifically designed to promote equiaxed structure. A columnar structure was obtained despite the presence of the inoculant. The mold was preheated to 1700° F. and poured in a vacuum. The metal was poured at a temperature of 2850° F. Before casting the mold was brought to a steady state rotation of 60 r.p.m. about an axis roughly coincident with the axis of the casting. Two minutes after the casting was poured, the rotation was stopped. In FIG. 8 the effects of steady state rotation can be seen as an overcoming of the chill effects to produce instead a columnar structure rooting the blade to the hub of the wheel. In FIGS. 5 to 7 the effects of the disruption at the two-minute solidification time can be seen in the hub as an abrupt zone of fine grains on the lower surface and as a zone of enhanced dendritic structures on the upper surface. The abrupt change in structure results directly from the rapid deceleration of the sudden cessation of rotation.

FIGS. 9 through 12 show the same aspects of an Inco 713 turbine wheel casting using a procedure slightly distinct from that described in connection with FIGS. 5 through 8. In this case the metal was heated to 2950° F. and the mold was preheated to 1900° F. Therefore, in order to produce a disruption at about the same radius on the wheel, the first velocity change was instituted at 2.25 minutes after casting rather than the two minutes of FIGS. 5 through 8. The mold structure was brought to a steady state rotation of 60 r.p.m. After the mold had been poured and 2.25 minutes had elapsed, the metal was manipulated by simply shutting off the rotation imparting motor until rotation ceased and then again energizing the motor. This simplest form of oscillation was continued until solidification had become complete.

The bottom surface as shown in FIGS. 9 and 10 depict the controlled appearance and maintenance of fine grained structure concurrent with the imposition of the oscillation. The upper surfaces shown in FIGS. 11 and 12 demonstrate the same result as the lower surface, a slight difference being related to mold design and cooling. The transition from an equiaxed chill zone to a promoted columnar zone in the root of the blade is the same as or slightly better than that shown in FIG. 8.

The above description demonstrates that low velocity rotation of a molten metal filled mold about an axis generally normal to the direction of heat flow is capable of reducing convective flow of the metal. This reduction in convective heat flow tends to stabilize columnar grain growth in ingots and castings of any shape, but particularly in rotationally symmetrical bodies such as wheels with blades, or blades only connected by a central sprue to form a rudimentary wheel columnar growth is radially stabilized.

Similarly, short time oscillations or changes in rotational direction or accelerations or decelerations of rotation about an axis generally normal to the direction of heat flow act to destroy columnar growth and further to create equiaxed grains as the dominant casting structure.

We claim as our invention:

1. The process of producing a casting having at least one zone of equiaxed structure and at least one zone of columnar structure comprising rotating the casting during the time the portion of the casting in which the columnar grains are desired at a speed sufficient to inhibit convective flow in the solidifying metal and applying an angular acceleration sufficient to inhibit the formation of a columnar structure to the casting during the time the portion of the casting in which an equiaxed structure is desired is solidifying.

2. The process recited in claim 1 in which the casting is a turbine wheel in which the integral blading has an equiaxed structure which merges into a columnar structure at the joint of the blades to the body of the turbine wheel.

References Cited
UNITED STATES PATENTS

| | | | |
|---|---|---|---|
| 1,040,517 | 10/1912 | Crawford | 164—115 |
| 1,775,859 | 9/1930 | Hultgren | 164—122 X |
| 3,414,045 | 12/1968 | Harvey | 164—116 |

J. SPENCER OVERHOLSER, Primary Examiner

R. S. ANNEAR, Assistant Examiner

U.S. Cl. X.R.

164—114